Patented Jan. 5, 1932

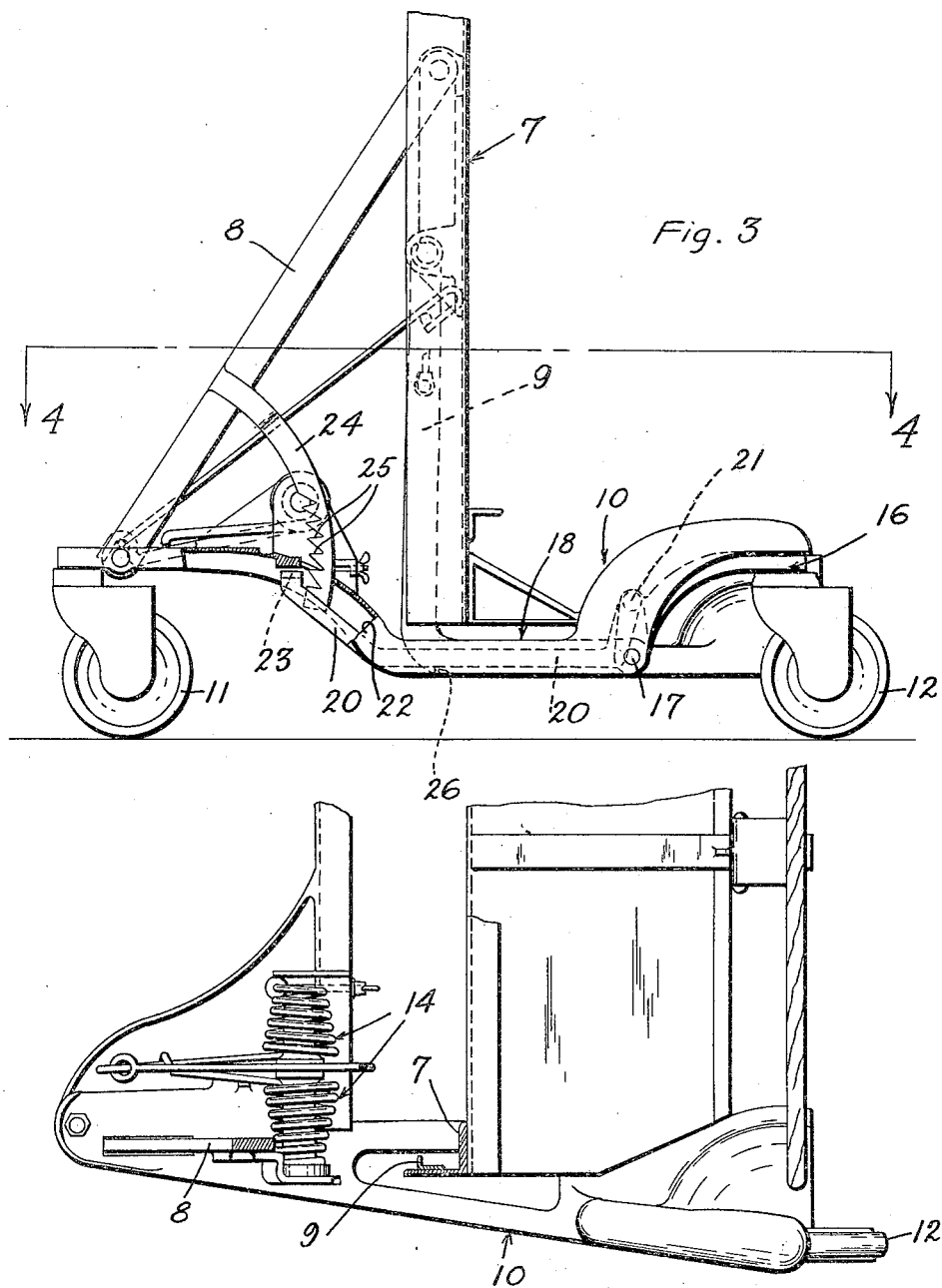

1,839,831

UNITED STATES PATENT OFFICE

GORDON F. CANE, OF SAN FRANCISCO, CALIFORNIA, ASSIGNOR, BY MESNE ASSIGNMENTS, TO THORN THOMPSON, OF SAN FRANCISCO, CALIFORNIA

SAFETY LOCK FOR FOLDABLE BEDS

Application filed July 29, 1929. Serial No. 381,748.

This invention relates to improvements in beds of the foldable roll-about type in which an upendable bed frame is mounted on a wheeled truck and has particular reference to a novel and efficacious means for preventing the bed from collapsing or "jack-knifing".

An object of the invention is to provide in a bed of the character described a safety means which regardless of the position of the bed frame will in a particularly positive and reliable manner automatically lock the bed frame and truck against collapsing or jack-knifing in the event of tilting of the truck or on lifting or otherwise moving the truck from proper contact with the floor.

Another object is to provide on a bed of the character described a safety locking means in which a floor-engaging part of the truck is arranged to move relative to the truck in the event the truck is tilted or lifted and operates in a particularly positive manner to lock and unlock said locking means when the bed frame is in any position.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings.

Figure 3 is a fragmentary side elevation of the bed of the invention as when upended.

Figure 4 is a horizontal sectional view taken on the plane of line 4—4 of Figure 3.

Figure 1:
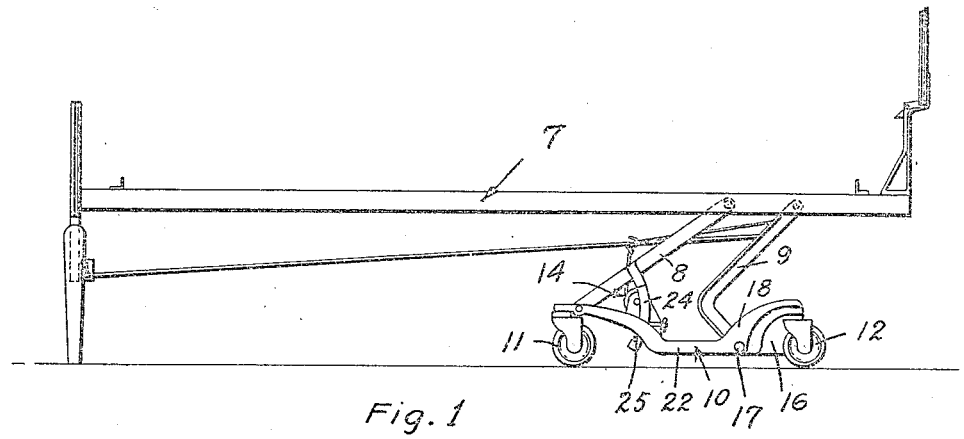
Figure 1 is a side elevation of a bed constructed in accordance with this invention shown in operative or extended position.
Figure 2:
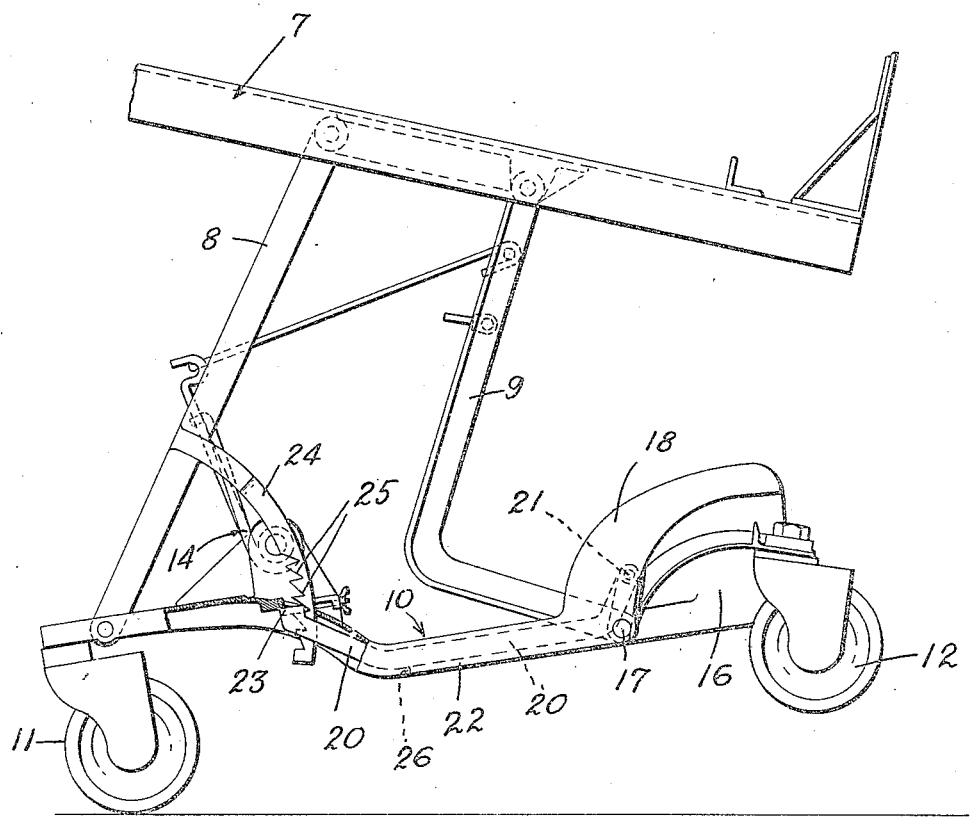
Figure 2 is an enlarged fragmentary side elevation of the bed showing the truck tilted and locked with the bed frame by means of the safety lock of this invention.

The present embodiment of this invention as shown in detail in the accompanying drawings comprises a bed frame 7 pivotably connected by front and rear links 8 and 9 with a freely movable truck 10 supported on front and rear casters 11 and 12. By this arrangement the bed frame may be swung from vertical or upended position into horizontal or extended position and vice versa, the wheeled truck permitting movement of the bed in undefined paths about a room or through a doorway or wall opening.

Owing to the manner of connecting the bed frame with the truck and to the use of counter-balancing springs such as the ones 14 here shown, the truck if tilted or lifted off or otherwise moved out of proper contact with the floor tends to swing rearward and upward towards the head end of the bed frame. If this movement of the truck were permitted, the occupant, or person standing near the head of the bed, might be injured by the truck or in the resultant collapse of the bed structure, or if no injury is caused the bed may be seriously or possibly permanently damaged or broken. The tilting of the truck is likely to occur if, while swinging the bed downward towards or into extended position, or while drawing the bed structure bodily to a desired location, the front casters or front part of the truck strike an obstruction such as a rug or carpet. Upon thus encountering an obstruction the truck tends to or will fulcrum about said casters with the result that the truck will or may be tilted. Tilting of the truck may also be caused if the bed frame is too forcibly or suddenly turned on its axis or if the head end of the bed be lifted.

With my invention I make use of this accidental tilting of the truck and a floor engaging part of the truck as operating factors for a particularly efficient means which in any position of the bed frame locks the truck against such movement as would cause injury to persons occupying or standing near the bed or the bed structure. In the present instance the rear casters 12 are arranged to move relative to the truck on tilting or lifting of the latter and on return of the truck to normal position and provide for positively locking and unlocking the said locking means.

Referring more specifically to the drawings, it will be noted that the rear casters 12 are mounted on arms or truck portions 16 pivoted as at 17 to the body 18 of the truck, and arranged to gravitate downward with the casters when the latter are lifted off the floor and to be moved back to normal position by direct engagement with the floor when the bed is manipulated to restore the truck to normal floor engaging position.

Arranged to be retracted and projected by the arms or truck portions 16 are locking pawls 20 pivoted as at 21 to said portions 16 and slidably supported on the side member 22 of the truck body. When retracted these parts dispose their laterally extended free ends 23 in locking engagement with arcuate arms 24 here shown as fixed to and extending downwardly from the front links 8 in sliding engagement with the inner sides of the pawls and provided with notches 25 arranged to lockingly engage with said ends 23. On now referring to the drawings it will be noted that the locking pawls are guided by the slidable engagement thereof with the sides and top of the truck body members 22 and the arms 24, the upward movement of said pawls being limited by the top portion of the members 21 whereas stop members 26 on the truck limit downward movement of and also guide said pawls.

With reference to the foregoing description and accompanying drawings it will now be seen that, if for any reason the truck is tilted or moved out of proper relation to the floor in such manner that the casters 12 and arms 16 may gravitate downward relative to the truck, the locking pawls 20 will be retracted and the ends 23 thereof moved into engagement with certain of the notches 25 in the arms 24. This will lock the truck and arms 24 and in fact the front links 8 and bed frame, or in other words, the bed frame and truck against relative movement and thereby circumvent the collapsing or "jack-knifing" movement of the bed, which movement would otherwise immediately follow the "tilting" of the truck. It is very important to note that this automatic locking action will take place at any position of the bed frame.

To unlock or release the bed, the operator tilts the bed structure by fulcruming it on the front casters 11 in such manner that the rear casters 12 will contact with the floor and thereby move the truck portions 16 and truck as a whole to normal position. During such movement of the portions 16 the pawls 20 are projected forwardly and the ends 23 are thereby moved out of locking engagement with the notches 25 of the arms 24, thus freeing the truck and bed frame, whereby the latter may be moved as desired about its axis. Inasmuch as the arms 24 are carried by the link 8 close to the truck, the locking means is not dependent on the bed frame being in a particular position and will operate with the frame in any position. Furthermore these arms 24, located and arranged as here shown and described, move through a comparatively small arc and provide for the convenient use of a simple form of locking pawls and the simply constructed rockingly mounted rear casters 12 whereby the locking means as a whole is of compact form and arranged in an inconspicuous and desirably-close-to-floor-position on the truck. It is to be further noted that, by having the locking means well spaced below the bed frame close-to-the-floor and for the most part concealed and covered by the truck, not only is marring the highly desirable "regular" bed appearance avoided but danger of the occupant or operator of the bed getting his hands caught in the locking means and the catching or entanglement of bedding are eliminated.

I claim:

1. In a foldable bed of the roll-about type a sectional truck comprised of relatively movable body sections, a bed frame carried by and arranged for rotation relative to said truck, and means operative upon movement of one truck section relative to the other and while the frame is in any position for locking the frame against rotation relative to said truck.

2. In a foldable bed of the roll-about type, a truck comprised of pivotally connected sections each arranged for engagement with the floor, a bed frame carried by and arranged for rotation on said truck, and means operative, on pivotal movement of one of said sections relative to the other, for locking the truck against movement relative to the frame.

3. In a foldable bed of the roll-about type, a truck comprised of pivotally connected sections each arranged for engagement with the floor, a bed frame carried by and arranged for rotation on said truck, and means operative, in any position of the bed frame, on pivotal movement of one of said sections relative to the other, for locking the truck against movement relative to the frame.

4. In a foldable bed of the roll-about type, a truck, a bed frame, links pivotally connected with said frame and said truck and providing for movement of the frame from vertical to horizontal position and vice versa, a locking means on one of said links, a locking member on said truck and means operating on tilting of said truck for moving the locking member into locking engagement with said lock means.

5. In a foldable bed of the roll-about type, a truck, a bed frame, front and rear links pivotally connected with said frame and said truck and providing for movement of the frame from vertical to horizontal position and vice versa, a locking means on the front links, locking members on said truck, and means operating on tilting of the truck for moving the locking members into locking engagement with said lock means.

6. In a foldable bed of the roll-about type, a bed frame, a truck comprised of pivotally connected sections, links pivotally connected with said frame and truck, lock means on certain of the links, locking members on said truck, and means operating to move the members into engagement with the lock means incident to pivotal movement of one section relative to the other.

7. In a foldable bed of the roll-about type, a bed frame, a truck comprised of pivotally connected sections, links pivotally connected with said frame and truck, notched arms fixed to and extending from certain of the links, locking pawls mounted on the truck, and means operating to move the pawls into notches of said arms upon pivotal movement of one section relative to the other.

8. In a foldable bed of the roll-about type, a bed frame, a truck comprised of pivotally connected sections, links pivotally connected with the truck and said frame, lock means on one of said links, a locking pawl on one of said truck sections, and means operating to move the pawl into locking engagement with the lock means when the other truck section moves on its pivotal connection.

In testimony whereof I have hereunto set my hand at Oakland, California, this 18th day of July, 1929.

GORDON F. CANE.